US007742874B1

(12) United States Patent
Mayfield et al.

(10) Patent No.: US 7,742,874 B1
(45) Date of Patent: Jun. 22, 2010

(54) CONTROLLABLE EXTERNAL TO INTERNAL ANTENNA SWITCHING ALGORITHM AND CIRCUIT FOR POSITION REPORTING DEVICE

(75) Inventors: Douglas B. Mayfield, Fremont, CA (US); Brian Abraham Jackson, San Francisco, CA (US); Dennis Lee Workman, Morgan Hill, CA (US)

(73) Assignee: Trimble Navigation Ltd., Sunnyvale, CA (US)

( * ) Notice: Subject to any disclaimer, the term of this patent is extended or adjusted under 35 U.S.C. 154(b) by 1035 days.

(21) Appl. No.: 11/418,558

(22) Filed: May 6, 2006

Related U.S. Application Data

(63) Continuation-in-part of application No. 10/392,995, filed on Mar. 19, 2003, now Pat. No. 7,050,907.

(51) Int. Cl.
*G01C 21/00* (2006.01)

(52) U.S. Cl. ....................... 701/213; 701/207; 701/208; 340/989

(58) Field of Classification Search ......... 701/207–213; 342/357.01, 357.06, 357.08; 340/989–993; 455/456.1–456.6
See application file for complete search history.

(56) References Cited

U.S. PATENT DOCUMENTS

| | | | | |
|---|---|---|---|---|
| 6,801,853 | B2 | 10/2004 | Workman | |
| 7,263,441 | B1 * | 8/2007 | Janky et al. | 701/213 |
| 7,415,355 | B2 * | 8/2008 | Janky et al. | 701/213 |
| 7,627,427 | B2 * | 12/2009 | Nichols et al. | 701/213 |

* cited by examiner

*Primary Examiner*—Richard M. Camby
(74) *Attorney, Agent, or Firm*—Boris G. Tankhilevich

(57) ABSTRACT

A method for configuring an electronic device comprising: (A) substantially continuously detecting motion of the electronic device using an initiating device disposed within the electronic device, the electronic device further comprising a position determining component, and a wireless communications component; (B) substantially continuously receiving at least one external radio signal by using an initially selected antenna of the position determining component; (C) if reception of at least one external radio signal is not optimized, using the antenna/power supply switch to switch radio signal path between the initially selected antenna and a subsequently selected antenna to optimize the reception of at least one external radio signal; and (D) using the wireless communications component to transmit the current status of the external/internal antenna to the position tracking station.

12 Claims, 2 Drawing Sheets

CONTROLLABLE EXTERNAL TO INTERNAL ANTENNA SWITCHING ALGORITHM AND CIRCUIT FOR POSITION REPORTING DEVICE

This is a continuation-in-part (C-I-P) for the U.S. patent application entitled "A METHOD AND SYSTEM FOR CONTROLLING AN ELECTRONIC DEVICE", Ser. No. 10/392,995, filed on Mar. 19, 2003 now U.S. Pat. No. 7,050,907, and assigned to the assignee of the present invention. The patent application Ser. No. 10/392,995 is hereafter referred to as the patent application #1 and is hereby incorporated by reference in its entirety herein.

BACKGROUND OF THE INVENTION

1. Field of the Invention

The present invention relates to a position reporting device for determining and reporting the position of a person or an object, and more specifically, to a controllable external-to-internal antenna switch algorithm and circuit that enhances the functionality of the position reporting device.

2. Discussion of the Prior Art

The prior art position reporting devices are useful to locate and report the position of a person or object. A typical position reporting device comprises a navigation system such as the Global Positioning System (GPS) module and a mobile communications system such as a cellular modem.

The TrimTrac™ locator manufactured by Trimble Navigation Ltd, located at Sunnyvale, Calif., is a mobile tracking device that provides vehicle monitoring, security and recovery services to a broad number of subscribers. The TrimTrac locator device includes a GPS receiver and GSM modem that are integrated onto a single board and are controlled by a common microprocessor. A typical TrimTrac™ locator device includes two antennas: an internal GPA antenna and an external GPS antenna. However, only one antenna can be powered at the same time to avoid interference between the received GPS signals.

What is needed is to establish a procedure that would allow the TrimTrac™ locator the optimal usage of its two antennas.

SUMMARY OF THE INVENTION

To address the shortcomings of the prior art, the present application discloses an electronic device having two antennas, an internal antenna, and an external antenna, and a procedure that allows a user to optimize the usage of these two antennas.

One aspect of the present invention is directed to a method for configuring an electronic device.

In one embodiment, the method of the present invention comprises: (A) substantially continuously detecting motion of an electronic device by utilizing an initiating device comprising a motion detecting component, a memory including a switch algorithm, a processor, and a controller, (B) substantially continuously receiving at least one external radio signal by using a position determining component further comprising an internal antenna, a port for an external antenna, an external antenna, and an antenna/power supply switch, wherein at least one received external radio signal is used by the position determining component to determine position location of the electronic device; and (C) if reception of at least one external radio signal is not optimized, using the antenna/power supply switch to switch radio signal path between an initially selected antenna and a subsequently selected antenna to optimize the reception of at least one external radio signal.

In one embodiment of the present invention, wherein if motion of the device is detected in the step (A), the step (B) further comprises: (B1) substantially continuously receiving at least one external radio signal by using the initially selected antenna of the position determining component.

In one embodiment of the present invention, the step (B1) further comprises: (B1, 1) checking whether an external antenna attached to the external antenna port is functioning within a predetermined range of parameters. In this embodiment of the present invention, the set of parameters is selected from the group consisting of: {current consumption; and voltage level}. In one embodiment of the present invention, if the external antenna is functioning within the predetermined range of parameters, the step (B1, 1) further comprises: (B1, 1, 1) selecting the external antenna as the initially selected antenna. In another embodiment of the present invention, if the external antenna is not functioning within the predetermined range of parameters, the step (B1, 1) further comprises: (B1, 1, 2), selecting the internal antenna as the initially selected antenna.

In one embodiment of the present invention, if power of the received at least one external radio signal is less than a first predetermined threshold, the step (B1) further comprises: (B1, 2) selecting the external antenna as the initially selected antenna. In another embodiment of the present invention, if power of the received at least one external radio signal is greater than a second predetermined threshold, the step (B1) further comprises: (B1, 3) selecting the internal antenna as the initially selected antenna.

In one embodiment of the present invention, if motion of the device detected in the step (A) is substantially continuous within a predetermined time period, the step (B1) further comprises: (B1, 4) checking whether the initially selected antenna is functioning within the predetermined range of parameters, wherein the predetermined set of parameters is selected from the group consisting of: {current consumption; and voltage level}; and, if the initially selected antenna is not functioning within the predetermined range of parameters, (B1, 5) switching the initially selected antenna to the subsequently selected antenna by using the antennae/power supply switch, and using the antenna/power supply switch to switch radio signal path between the initially selected antenna and subsequently selected antenna to optimize the reception of at least one external radio signal.

In one embodiment of the present invention, the step (C) further comprises: (C1) selecting the initially selected antenna by using the antenna/power supply switch; and (C2) supplying power to the initially selected antenna by using the antenna/power supply switch.

In one embodiment of the present invention, the step (C) further comprises: (C3) switching the initially selected antenna to the subsequently selected antenna by using the antenna/power supply switch; and (C4) supplying power to the subsequently selected antenna by using the antenna/power supply switch.

In one embodiment of the present invention, the step (C) further comprises: (C5) programming the processor to switch power supply between the external antenna and the internal antenna based on the switch algorithm; and (C6) using the processor to execute the steps of the switch algorithm.

In one embodiment of the present invention, wherein the electronic device further comprises a wireless communications component coupled with the controller, the method further comprises: (D) using the controller automatically to cause the wireless communications component to transmit a message conveying a set of parameters to a position tracking station, wherein the set of parameters is selected from the group consisting of: {geographic locations of the electronic device determined within a pre-determined time parameter; and external/internal status of the currently selected antenna}.

Another aspect of the present invention is directed to an apparatus for configuring an electronic device.

In one embodiment, the apparatus of the present invention comprises: (A) a means for detecting motion of the electronic device; (B) a means for receiving at least one external radio signal; and (C) a means for switching a radio signal path of at least one received external radio signal.

In one embodiment of the present invention, the means (A) further comprises: (A1) a motion detector configured to detect the changes in the state of motion of the electronic device. In one embodiment of the present invention, the motion detector is selected from the group consisting of: {a vibration detector; an acceleration sensor; a tilt sensor; a rotation sensor; and a gyroscope}.

In one embodiment of the present invention, the means (B) further comprises: (B1) a position determining component configured to receive at least one external radio signal. In one embodiment of the present invention, the means (B) further comprises: (B2) an external antenna configured to receive at least one external radio signal. In one embodiment of the present invention, the means (B) further comprises: (B3) an internal antenna configured to receive at least one external radio signal.

In one embodiment of the present invention, the means (B) further comprises: (B4) a means for selecting an initial antenna; and (B5) a means for checking whether the initially selected antenna is functioning within a predetermined range of parameters, wherein the predetermined set of parameters is selected from the group consisting of: {current consumption; and voltage level}.

In one embodiment of the present invention, the means (C) further comprises: (C1) an antenna/power supply switch configured to switch a radio signal path between the initially selected antenna and a subsequently selected antenna to optimize the reception of at least one external radio signal.

In one embodiment of the present invention, the means (C) further comprises: (C2) a programmable processor including a switch algorithm, wherein the programmable processor is configured to execute the steps of the switch algorithm to optimize the reception of at least one external radio signal.

In one embodiment, the apparatus of the present invention further comprises: (D) a wireless communications component configured to transmit a message conveying a set of parameters to a position tracking station, wherein the set of parameters is selected from the group consisting of: {geographic locations of the electronic device determined within a pre-determined time parameter; and external/internal status of the currently selected antenna}.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
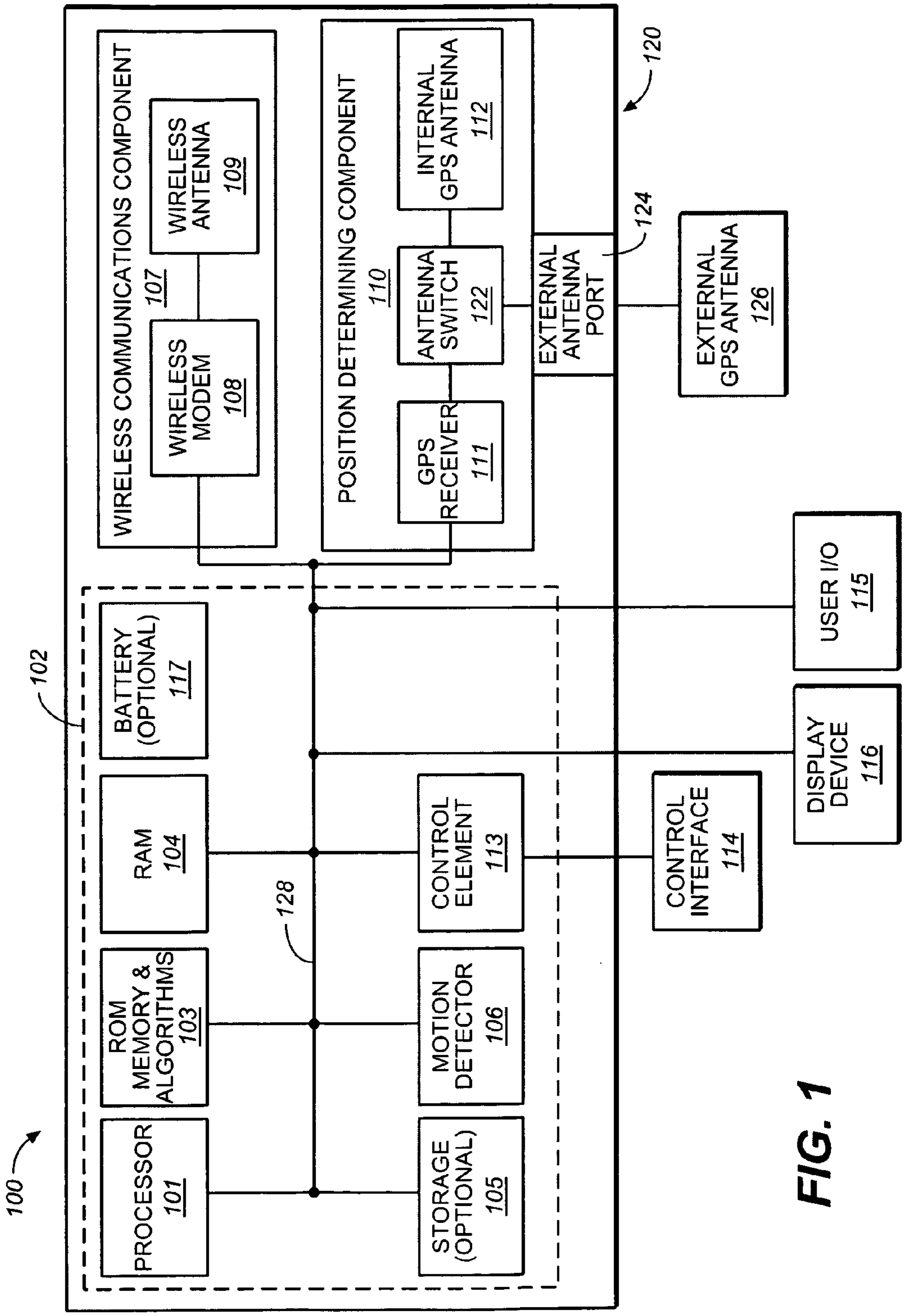
FIG. 1 depicts a block diagram of the apparatus of the present invention.

In one embodiment, FIG. 1 depicts a block diagram 100 of the apparatus of the present invention comprising an initiating component 102 further comprising a motion detector 106, a control element 113, a processor 101, and a memory element 103; a position determining component 110 further including a GPS receiver 111, an internal GPS antenna, an external antenna port 124, an external GPS antenna 126, and an antenna/power supply switch 122; and a wireless communication component 107 further including a wireless modem 108, and a wireless antenna 109. The motion detecting component 106 is configured to detect movement of the electronic device 100 and is configured to send a signal to the controller 113. In response to receiving this signal, the controller 113 initiates the position determining component 110 to determine the geographic location of the electronic device. This extends the battery life of the electronic device because the initiating component draws a minimal amount of power until movement of the device is detected.

There are several examples that are fully disclosed in the patent application #1. In one example, the geographic location is compared with the coordinates of a zone of interest to the user. Depending upon what zone the electronic device is in, the controller generates a command for causing the electronic device to perform a specific action. In another example, the electronic device can be automatically shut down when a particular zone is entered and can be automatically activated when that zone is left. In one more example, the position coordinates define a zone in which the asset can be moved without triggering an alarm. When the electronic device is moved outside of that zone, it sounds an audible alarm until inactivated. Alternatively, a wireless message can be sent to a monitoring service that notifies the owner of the device law enforcement agencies in order to facilitate recovering the electronic device.

The initiating component 102 is shown in FIG. 1 in more details, as fully disclosed in the patent application #1. More specifically, the processor 101 is coupled with the bus 128. Processor 101 is configured to process digital information and instructions and bus 128 is configured to convey digital information between the various components of initiating component 102. Also coupled with bus 128 is a non-volatile read only memory (ROM) 103 for storing information and instructions of a more permanent nature, and a random access memory (RAM) 104 for storing the digital information and instructions of a more volatile nature. In addition, initiating component 102 may optionally include a data storage device 105 for storing vast amounts of data. The data storage device 105 may be implemented by using a removable storage medium such as a smart card or an optical data storage device. Alternatively, data storage device 105 may be implemented by using a programmable data storage device such as a flash memory device to facilitate quickly updating data. The instructions for processor 101 as well as position coordinates which define a predefined zone can be stored either in volatile memory 104, data storage device 105, or in an external storage device (not shown). Similarly, previously determined geographic locations of initiating component 102, previously sampled GPS signals can be stored either in volatile memory 104, data storage device 105, or in an external storage device.

As it is fully disclosed in the patent application #1, the motion detector 106 may be implemented by detecting the vibration associated with the movement of initiating component 102 and indicates this movement to processor 101 when changes in the vibration of initiating component 102 are detected. The motion detector 106 may be also implemented by using an acceleration sensor, a tilt sensor, a rotation sensor, a gyroscope, etc. The motion detector 106 detects when initiating component 102 transitions from a substantially stationary state to a moving state. Motion detector 106 can also detect when initiating component 102 transitions from a moving state to a substantially stationary state by detecting changes in the rate of movement of initiating component 102. Thus, the motion detector 106 detects changes in the state of motion of initiating component 102 such as starting or stopping of motion, and generates an interrupt to processor in response to these changes in motion. In response to an interrupt from motion detector 106, processor 101 changes the operating state of initiating component 102 from an idle operating state, in which a few components of initiating component 102 (motion detector 106, processor 101) draw a minimal amount of power, to an active operating state in which position determining component 110 and wireless communications component 107 draw additional power.

Referring still to FIG. 1, as it is fully disclosed in the patent application #1, the wireless communications component 107, comprising a wireless modem 108 and a wireless antenna 109, is coupled with bus 128. Wireless communications component 107 is configured for transmitting and receiving wireless messages data commands. The wireless communications component 107 may be implemented by using a wireless data device using Short Message Service (SMS), Bluetooth wireless communications device, or another wireless communications device such as Wife transceiver. Wi-Fi transceivers are often used to create local area networks between a portable computer and an Internet access point in public areas such as airports, coffee shops, libraries, and the like.

Referring still to FIG. 1, as it is fully disclosed in the patent application #1, position determining system 110 is configured to determine the location of the initiating component 102.

In one embodiment of the present invention, as was stated above, the position determining component 110 comprises the GPS internal antenna 112, the GPS receiver 111, the antenna/power supply switch 122, and the external GPS antenna 126 connected to the external GPS port 124.

In another embodiment of the present invention, the position determining component 110 comprises an internal radio antenna (not shown) configured to receive at least one external radio signal from a plurality of radio sources, an external radio antenna (not shown) configured to receive at least one external radio signal from a plurality of radio sources, an antenna/power supply switch (not shown), and an external radio antenna port (not shown). In this embodiment of the present invention, the plurality of radio sources include: GLONASS satellite system, GALILEO satellite system, GNSS (General Navigation Satellite System), pseudolite radio system, or any other terrestrial radio system.

Referring still to FIG. 1, as it is disclosed in the patent application #1, the control element 113 coupled with bus 128 is configured to generate a control signal via control interface 114 depending upon the current time location of initiating component 102. A display device 116 for displaying information to a user can be optionally coupled to initiating component 102. The display device 116 may be implemented by using a liquid crystal device, cathode ray tube, a field emission display, or any other display device suitable for creating graphic images and alpha-numeric characters recognizable to a user. A user input device 115 can be also coupled with bus 128. The user input device 115 may be implemented by using a keyboard, a cursor control device, a mouse, a trackball, a light pen, a touch pad, and a joystick configured to input data, selections, updates, and controlling initiating component 102. Initiating component 102 can also include a battery 117 for providing power for initiating component 102. If, however, the initiating component 102 is disposed within a laptop computer, it may draw power from the laptop computer itself.

As it is disclosed in the patent application #1, the initiating component 102 can be disposed upon a printed circuit board (not shown) such as a Personal Computer Memory Card Industry Association (PCMCIA) card, etc. This allows the usage of the present invention in association with a variety of electronic devices such as cellular telephones, laptop computers, personal digital assistants automotive electrical systems, and the like.

However, as it is also disclosed in the patent application #1, the initiating component 102 can be a stand alone device that is used to control another device. For example, initiating component 102 can be installed in an automobile and used to initiate an action depending upon the location of the automobile. Thus, the components comprising initiating component 102 may be disposed within a housing.

It is appreciated that some of the components recited in the above discussion may be omitted in embodiments of the present invention. For example, when initiating component is disposed within a laptop computer, or a PDA, display device 116 and user input device 115 may be redundant and therefore omitted to reduce the cost of initiating component 102. In other implementations, initiating component 102 may be disposed in an electronic device already having a wireless communications capability (a cellular telephone). Thus, wireless communications component 107 may be omitted in order to reduce the cost of initiating component 102. Additionally, control element 113 may be omitted if a control signal may be generated by processor 101 via control interface 114 for controlling an electronic device.

As it is disclosed in the patent application #1, in one example of usage, if the motion detector 106 detects movement of initiating component 102, it generates an interrupt signal to processor 101. In response to the interrupt signal, processor 101 activates other components of initiating component 102 such as wireless communications component 107 and position determining component 110. The geographic location of initiating component 102 is then determined using position determining component 110. Processor 101 compares the present geographic location with geographic coordinates that define a pre-defined zone. The coordinates of the pre-defined zone may reside in RAM 104 or in storage device 105. Based upon this comparison, processor causes control element 113 to generate a command for controlling the electronic device in which initiating component 102 resides. Alternatively, processor 101 may generate the command for controlling the electronic device 100 itself. For example, initiating component 102 may be configured to generate a command causing the electronic device 100 to become inactivated when it enters a restricted zone such as a theater, or a gangway leading from the departure lounge to the aircraft while boarding. Since the unit is programmed to operate autonomously to perform this shutdown function, it will work for items which are stored in luggage as well, performing another valuable service by ceasing battery drain while located in an unusable space. When the electronic device moves outside of the restricted zone, processor 101 may generate a signal causing the electronic device to become activated again. This is a great convenience to users who may forget to turn off their electronic devices when they enter a restricted area or to turn them back on when they leave the restricted area.

As it is disclosed in the patent application #1, in another example of usage, the storage device 105 stores a database of geographic coordinates which can define a plurality of pre-defined zones and associated commands that are to be generated by processor 101 depending upon whether the electronic device 100 is inside of or outside of a pre-defined zone. Additionally, the geographic coordinates can define a route or plurality of routes. If the electronic device 100 deviates from a specified route processor 101 can generate commands to the electronic device 100. For example, processor 101 can cause the electronic device to sound an alarm or other noise as a theft deterrent if the device is removed from a specified zone. Alternatively, processor 101 can initiate sending a message via wireless communications device 103 notifying the owner of the electronic device that it has left a specified zone, or notify police or other agencies. Additionally, processor 101 can initiate continuous location updates to assist in recovering the electronic device if it has been stolen. The geographic location or route information used to determine what action should be initiated by the present invention may further be modified using temporal information. For example, if initiating component is disposed within an automobile, time parameters may be used in conjunction with location parameters to determine what action should be initiated by the present invention. Thus, a user could designate his or her typical route used when commuting to work and the hours when the automobile is permitted to be within that route. If the automobile is stolen, even if it is at a geographic location within the pre-defined boundaries of the commuting route, initiating component 102 may generate a control signal because it is at that location at the wrong time of the day. Initiating component 102 may initiate generating a message conveying that the automobile has been stolen as described above, or may in some manner disable the automobile to prevent further movement of the automobile. For example, initiating component 102 may be coupled with the ignition system or the computer of the automobile.

After determining that unauthorized movement of the automobile has occurred, initiating component 102 may generate a control signal to disable the automobile's engine the next time motion detector 106 determines that the car has stopped moving. Therefore, the initiating component 102 does not disable the automobile, for example, in the middle of a highway which may endanger other commuters.

Referring still to FIG. 1, in one embodiment of the present invention. the ROM memory block 103 also includes the switching algorithm.

In one embodiment of the present invention, the switching algorithm comprises the following steps: (A) substantially continuously detecting motion of the electronic device 100 by utilizing the motion detecting component 106; and (B) if motion of the electronic device is detected, substantially continuously receiving at least one external radio signal by using an initially selected antenna of the position determining component 110, wherein at least one received external radio signal is used by the position determining component to determine position location of the electronic device 100; and (C) if reception of at least one external radio signal is not optimized, using the antenna/power supply switch 122 to switch radio signal path between the initially selected antenna and a subsequently selected antenna to optimize the reception of at least one external radio signal.

In one embodiment of the present invention, the step (B1) of the switching algorithm further comprises the following steps: (B1, 1) checking whether an external antenna 126 attached to the external antenna port 124 is functioning within a predetermined range of parameters. In this embodiment of the present invention, the set of parameters is selected from the group consisting of: {current consumption; and voltage level}.

In one embodiment of the present invention, if the external antenna 126 is functioning within the predetermined range of parameters, the step (B1, 1) of the switching algorithm further comprises: (B1, 1, 1) selecting the external antenna 126 as the initially selected antenna.

If, however, the external antenna 126 is not functioning within the predetermined range of parameters, the step (B1, 1) of the switching algorithm further comprises the step (B1, 1, 2) of selecting the internal antenna 112 as the initially selected antenna.

If both external and internal antennas are functioning within the predetermined range of parameters, and if power of at least one received external radio signal is less than a first predetermined threshold, the step (B1) of the switching algorithm further comprises the step (B1, 2) of selecting the external antenna 126 as the initially selected antenna. The first predetermined threshold is a power level at which the internal antenna 112 is capable of receiving the radio signals suitable for position determination of the electronic device 100.

If, on the other hand, the power of at least one received external radio signal is greater than a second predetermined threshold, and if the external antenna 126 is not available, or is not functioning within the predetermined range of parameters, the step (B1) of the switching algorithm further comprises the step (B1, 3) of selecting the internal antenna 112 as the initially selected antenna.

If motion of the electronic device 100 detected in the step (A) is substantially continuous within a predetermined time period, the step (B1) of the switching algorithm further comprises the step (B1, 4) of checking whether the initially selected antenna is functioning within the predetermined range of parameters. If the initially selected antenna is not functioning within the predetermined range of parameters, the step (B1) of the switching algorithm further comprises the step (B1, 5) of switching the initially selected antenna to the subsequently selected antenna by using the antennae/power supply switch 122 and using the antenna/power supply switch 122 to switch radio signal path between the initially selected antenna and subsequently selected antenna to optimize the reception of at least one external radio signal.

In one embodiment of the present invention, the switch algorithm also comprises the step (D) of using the controller 113 to automatically cause the wireless communications component 107 to transmit a message conveying a set of parameters to a position tracking station (not shown), wherein the set of parameters is selected from the group consisting of: {geographic locations of the electronic device determined within a pre-determined time parameter; and external/internal status of the currently selected antenna}.

In one embodiment of the present invention, the processor 101 is programmed to switch power supply between the external antenna 126 and the internal antenna 112 based on the switch algorithm residing in the ROM 103. The processor 101 is also configured to execute the described above steps of the switch algorithm.

Figure 2:
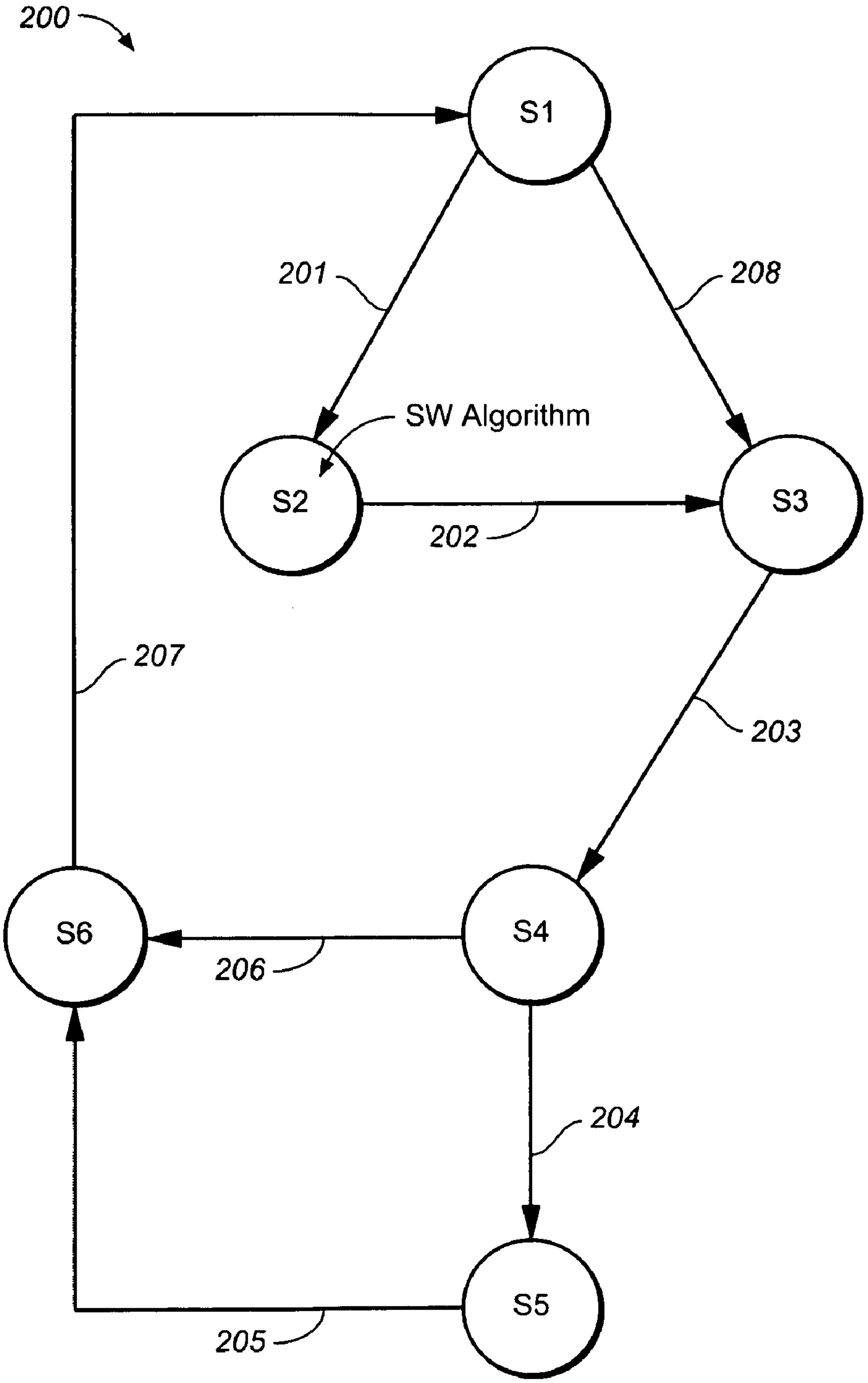
FIG. 2 is a diagram showing the operating states of the state machine including switch algorithm for the purposes of the present invention.

FIG. 2 is a diagram showing the operating states of initiating component 102 as fully described in the patent application #1. In S1 operating state of FIG. 2, initiating component 102 is in an idle operating state and the only components drawing power are a real time clock of processor 101 and motion detector 106. This allows initiating component 102 to remain in an operating state in which a minimal amount of power is drawn from the electronic device 100 in which the initiating component 102 is disposed.

At event 201 of FIG. 2 motion detector 106 detects a change of the motion state of electronic device 100 and generates an interrupt to the controller 113 of processor 101 of FIG. 1. The change of motion state may be a starting or stopping of motion, or an acceleration or deceleration of initiating component 102. In response to the interrupt from motion detector processor 101 causes initiating component 102 to transition to operating state S2.

Operating state S2 is an active operating state of initiating component 102 that also includes the switch algorithm of the present invention. The switch algorithm will select the initially selected optimum antenna, and will also switch to the subsequently selected optimum antenna, if the initially selected antenna looses its optimum status, as fully disclosed above. The initiating component 102 will attempt to attain a position fix of its current geographic location by using position determining component 106 that utilizes the selected antenna.

When initiating component 102 successfully determines its position within a pre-determined time period, it automatically attempts to send a "fix" message to position tracking station (not shown) providing the current time and present geographic location of the device, and also the status of the currently selected antenna. Initiating component 102 will then continue to periodically determine its position and send that position information to position tracking station (not shown) while motion detector 106 detects that initiating component 102 is being moved. This allows position tracking station to track initiating component 102, and thus the electronic device that initiating component 102 is monitoring, as it is being moved. The time period between position fixes is determined by the pre-determined time period of operating state S6 of FIG. 2. The pre-determined time period for determining the present location of initiating component 102 can be a default setting, set by the user of initiating component 102, or set by position tracking station. If initiating component 102 can not determine its position within the pre-determined time period, it will automatically initiate transmitting a "no-fix" message to position tracking position tracking station. The no-fix message conveys to position tracking station that initiating component 102 has detected movement of electronic device 100 and that its position could not be determined using a position determining system within the pre-determined time period. However, the position of initiating component 102 may be checked against the cellular ID sector information contained in the SMS no-fix message exchanged with position tracking station while in operating state or roughly triangulated using a plurality of cellular towers.

At event 202 of FIG. 2, the initiating component 102 transitions to operating state S3 after successfully determining its position. Alternatively, initiating component 102 automatically transitions to operating state S3 if a time period 208 expires before motion detector 106 detects movement. Time period 208 can be a default setting, a pre-determined parameter set by the user of initiating component 102, or set by position tracking station. If initiating component 102 has successfully determined its location using position determining component it then determines what action should be initiated based upon the current time location in operating state S3. For example, a database may be accessed from storage device 105 that describes pre-determined actions to be taken based upon the current time geographic location of initiating component 102. Thus, when electronic device 100 enters a zone defining an airport, the pre-determined action may be to generate a signal to invoke a shut-down routine for electronic device 100. When electronic device 100 leaves the zone defining the airport, initiating component 102 may generate a signal for starting electronic device 100 again. Additionally, initiating component 102 may be configured to perform different actions depending upon what zone electronic device 100 is currently in. For example, if initiating component 102 is used to control a laptop computer, a user can configure the present invention so that a particular software application (a spreadsheet application) is initiated when the laptop is brought into the vicinity of the user's workplace and to initiate a different software application (a Web browser application) when the laptop is brought into the vicinity of the user's home. As stated above, the action initiated by the present invention may also be determined by the current location in conjunction with the current time. Thus, the present invention may be configured to initiate one action when at a given location at a particular time and to initiate a second action at the same location but at a different time.

Additionally, during operating state S3, the operating parameters of initiating component may be checked. For example, the status of battery 117 may be checked to determine if a battery change will be necessary soon. Other parameters may include the length of time period 208, the time interval for successfully determining the present geographic location of initiating component 102 during operating state.

At event 203 of FIG. 2, initiating component 102 transitions to operating state S4. In operating state S4, initiating component 102 attempts to transmit data to position tracking station (not shown). For example, initiating component 102 may attempt to transmit the current time and geographic location of electronic device 100 to position tracking station (not shown) using wireless communications component 107.

At event 204, initiating component 102 transitions to operating state S5. While in operating state S5, initiating component 102 is in a query state and can receive commands and operating parameters from position tracking station. Additionally, at this time commands can be received for changing the operating parameters of initiating component. For example, the time period in which position determining component 110 is allowed to determine the position of initiating component 102 can be changed during operating state S5. Other parameters may include the database defining pre-designated geographic zones for initiating action to be taken when entering or leaving one of the pre designated geographic zones.

At event 205, when communications with position tracking service provider (not shown) have completed, initiating component 102 transitions to operating state S6. Alternatively, at event 206, initiating component 102 transitions to operating state S6 if a pre-designated time interval elapses in which initiating component 102 was not able to successfully transmit data during operating state S4. Operating state S6 is a delay state in which initiating component 102 is forced to remain idle for a pre-determined time period. This sets a time interval between successive position fixes and prevents initiating component 102 from drawing excessive battery power from electronic device 100 in attempting to constantly determine its position while it is being moved.

After the pre-determined time period of operating state S6 has expired, the initiating component 102 again enters operating state S1 at event 207 at which point initiating component 102 can repeat the process if motion detector 106 detects that electronic device 100 is being moved.

In one embodiment, the method of the present invention (not shown) comprises: (A) substantially continuously detecting motion of an electronic device 100 by utilizing a motion detecting component 106; (B) substantially continuously receiving at least one external radio signal by using an initially selected antenna of the position determining component 110; and (C) if reception of at least one external radio signal is not optimized, using the antenna/power supply switch 122 to switch radio signal path between the initially selected antenna and a subsequently selected antenna to optimize the reception of at least one external radio signal.

In one embodiment of the present invention, if motion of the device is detected in the step (A), the step (B) further comprises: (B1) substantially continuously receiving at least one external radio signal by using the initially selected antenna of the position determining component 110.

In one embodiment of the present invention, the step (B1) further comprises: (B1, 1) checking whether an external antenna 126 attached to the external antenna port 124 is functioning within a predetermined range of parameters. In this embodiment of the present invention, the set of parameters is selected from the group consisting of: {current consumption; and voltage level}.

In one embodiment of the present invention, if the external antenna 126 is functioning within the predetermined range of parameters, the step (B1, 1) further comprises: (B1, 1, 1) selecting the external antenna 126 as the initially selected antenna. In another embodiment of the present invention, if the external antenna 126 is not functioning within the predetermined range of parameters, the step (B1, 1) further comprises: (B1, 1, 2), selecting the internal antenna 112 as the initially selected antenna.

In one embodiment of the present invention, if power of the received at least one external radio signal is less than a first predetermined threshold, the step (B1) further comprises: (B1, 2) selecting the external antenna 126 as the initially selected antenna. In another embodiment of the present invention, if power of the received at least one external radio signal is greater than a second predetermined threshold, the step (B1) further comprises: (B1, 3) selecting the internal antenna 112 as the initially selected antenna.

In one embodiment of the present invention, if motion of the device 100 detected in the step (A) is substantially continuous within a predetermined time period, the step (B1) further comprises: (B1, 4) checking whether the initially selected antenna is functioning within the predetermined range of parameters, and, if the initially selected antenna is not functioning within the predetermined range of parameters, (B1, 5) switching the initially selected antenna to the subsequently selected antenna by using the antenna/power supply switch 122, and using the antenna/power supply switch 122 to switch radio signal path between the initially selected antenna and subsequently selected antenna to optimize the reception of at least one external radio signal.

In one embodiment of the present invention, the step (C) further comprises: (C1) selecting the initially selected antenna by using the antenna/power supply switch 122; and (C2) supplying power to the initially selected antenna by using the antenna/power supply switch 122.

In one embodiment of the present invention, the step (C) further comprises: (C3) switching the initially selected antenna to the subsequently selected antenna by using the antenna/power supply switch 122; and (C4) supplying power to the subsequently selected antenna by using the antenna/power supply switch 122.

In one embodiment of the present invention, the step (C) further comprises: (C5) programming the processor 101 to switch power supply between the external antenna 126 and the internal antenna 112 based on the switch algorithm; and (C6) using the processor 101 to execute the steps of the switch algorithm.

In one embodiment of the present invention, the method further comprises: (D) using the controller 113 to automatically cause the wireless communications component 107 to transmit a message conveying a set of parameters to a position tracking station, wherein the set of parameters is selected from the group consisting of: {geographic locations of the electronic device determined within a pre-determined time parameter; and external/internal status of the currently selected antenna}.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for configuring an electronic device comprising:

(A) substantially continuously detecting motion of an electronic device by using an initiating device disposed within said electronic device, said electronic device comprising said initiating device, a position determining component, and a wireless communications component; said initiating device further comprising: a motion detecting component, a controller, a memory including a switch algorithm, and a processor; said position determining component further comprising an internal antenna, a port for an external antenna, an antenna/power supply switch; and an external antenna; said wireless communications component further comprising a wireless modem, and a wireless antenna;

(B) substantially continuously receiving at least one external radio signal by using an initially selected antenna of said position determining component; said at least one external radio signal being used by said position determining component to determine position location of said electronic device; and (C) if reception of said at least one external radio signal is not optimized, using said antenna/power supply switch to switch radio signal path between said initially selected antenna and a subsequently selected antenna to optimize the reception of said at least one external radio signal.

2. The method of claim 1, wherein said step (B) further comprises:

(B1) if motion of said device is detected in said step (A), substantially continuously receiving at least one external radio signal by using said initially selected antenna of said position determining component; said at least one external radio signal being used by said position determining component to determine position location of said electronic device.

3. The method of claim 2, wherein said step (B1) further comprises:

(B1, 1) checking whether an external antenna attached to said external antenna port is functioning within a predetermined range of parameters, wherein said set of parameters is selected from the group consisting of: {current consumption; and voltage level}.

4. The method of claim 3, wherein said step (B1, 1) further comprises:

(B1, 1, 1) if said external antenna is functioning within said predetermined range of parameters, selecting said external antenna as said initially selected antenna.

5. The method of claim 3, wherein said step (B1, 1) further comprises:

(B1, 1, 2) if said external antenna is not functioning within said predetermined range of parameters, selecting said internal antenna as said initially selected antenna.

6. The method of claim 2, wherein said step (B1) further comprises:

(B1, 2) if power of said received at least one external radio signal is less than a first predetermined threshold, selecting said external antenna as said initially selected antenna.

7. The method of claim 2, wherein said step (B1) further comprises:

(B1, 3) if power of said received at least one external radio signal is greater than a second predetermined threshold, selecting said internal antenna as said initially selected antenna.

8. The method of claim 1, wherein said step (C) further comprises:

(C1) selecting said initially selected antenna by using said antenna/power supply switch; and (C2) supplying power to said initially selected antenna by using said antenna/power supply switch.

9. The method of claim 1, wherein said step (C) further comprises:

(C3) switching said initially selected antenna to said subsequently selected antenna by using said antenna/power supply switch; and (C4) supplying power to said subsequently selected antenna by using said antenna/power supply switch.

10. The method of claim 1, wherein said step (C) further comprises:

(C5) programming said processor to switch power supply between said external antenna and said internal antenna based on said switch algorithm; and (C6) using said processor to execute the steps of said switch algorithm.

11. The method of claim 2, wherein said step (B1) further comprises:

(B1, 4) if motion of said device detected in said step (A) is substantially continuous within a predetermined time period, checking whether said initially selected antenna is functioning within said predetermined range of parameters, wherein said predetermined set of parameters is selected from the group consisting of: {current consumption; and voltage level}; and (B1, 5) if said initially selected antenna is not functioning within said predetermined range of parameters, switching said initially selected antenna to said subsequently selected antenna by using said antenna/power supply switch, and using said antenna/power supply switch to switch radio signal path between said initially selected antenna and subsequently selected antenna to optimize the reception of said at least one external radio signal.

12. The method of claim 1 further comprising:

(D) using said controller automatically to cause said wireless communications component to transmit a message conveying a set of parameters to a position tracking station, wherein said set of parameters is selected from the group consisting of: {geographic locations of said electronic device determined within a pre-determined time parameter; and external/internal status of said currently selected antenna}.

* * * * *